United States Patent
Steinmetz et al.

[11] Patent Number: 5,809,521
[45] Date of Patent: Sep. 15, 1998

[54] SINGLE AND MULTISTAGE STAGE FIFO DESIGNS FOR DATA TRANSFER SYNCHRONIZERS

[75] Inventors: Joseph H. Steinmetz, Rocklin; Vicente V. Cavanna, Loomis, both of Calif.

[73] Assignee: Hewlett-Packard Company, Palo Alto, Calif.

[21] Appl. No.: 346,107

[22] Filed: Nov. 28, 1994

Related U.S. Application Data

[63] Continuation of Ser. No. 2,567, Jan. 11, 1993, abandoned.

[51] Int. Cl.[6] ............................................. H01J 1/00
[52] U.S. Cl. .......................... 711/116; 395/250; 395/872; 395/877
[58] Field of Search ..................... 395/496, 250, 395/467, 872, 873, 876; 375/372, 376, 354, 371; 711/116

[56] References Cited

U.S. PATENT DOCUMENTS

| | | | |
|---|---|---|---|
| 3,972,034 | 7/1976 | Derickson, III et al. . | |
| 4,433,394 | 2/1984 | Torii et al. | 365/221 |
| 4,839,866 | 6/1989 | Ward et al. | 365/221 |
| 4,873,703 | 10/1989 | Crandall et al. . | |
| 4,965,764 | 10/1990 | Aono | 364/900 |
| 4,965,794 | 10/1990 | Smith | 370/105.1 |
| 5,084,837 | 1/1992 | Matsumoto et al. | 395/250 |
| 5,138,637 | 8/1992 | Fox | 375/118 |
| 5,179,688 | 1/1993 | Brown et al. . | |
| 5,293,409 | 3/1994 | Doornenbal et al. | 375/106 |
| 5,365,552 | 11/1994 | Astle | 375/106 |
| 5,440,717 | 8/1995 | Bosshart | 395/486 |

FOREIGN PATENT DOCUMENTS

| | | |
|---|---|---|
| 0327115 | 9/1989 | Japan . |
| 2132456 | 4/1984 | United Kingdom . |

*Primary Examiner*—Wellington Chin
*Assistant Examiner*—Jean B. Corrielus

[57] ABSTRACT

An improved multi-stage synchronizer. The inventive synchronizer includes a first memory for storing data, a second memory means connected to the output of the first memory means for storing data, and a third memory for storing data connected to the output of the second memory means. The second memory includes a plurality of multi-stage first-in, first-out memory devices. In a particular embodiment, the first and third memories are implemented with synchronous single stage first-in, first-out memories. In a preferred embodiment, the first-in, first-out memories are designed to allow data to be read and written during a single clock cycle after the memory is full. This is achieved by adding an external read signal to the 'not full' signal generated by the device. The provision of single stage FIFO memories on either side of a multi-stage FIFO memory allows for lower set up time and output delay at higher operational speeds.

6 Claims, 4 Drawing Sheets

SINGLE AND MULTISTAGE STAGE FIFO DESIGNS FOR DATA TRANSFER SYNCHRONIZERS

This is a continuation of U.S. application Ser. No. 08/002,567 filed on Jan. 11, 1993, now abandoned.

BACKGROUND OF THE INVENTION

1. Field of the Invention

The present invention relates to data communication systems. More specifically, the present invention relates to systems and techniques for synchronizing data transfers across domain boundaries.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

2. Description of the Related Art

In many data communication applications, there is a need to transfer digital data across a domain boundary. In this context, a domain is a system which operates under a single clock signal. A domain boundary then is a border between two systems operating with different clock signals. Data transfers across a boundary must be synchronized and are therefore somewhat problematic.

One technique for achieving a reliable data transfer across a domain boundary is called 'speed matching'. Speed matching involves the momentary storage of the data in a first-in, first-out (FIFO) memory and the synchronous communication of control pointers thereto between the transmitting and receiving systems. The FIFO serves as a delay buffer to hold the data until the receiving system can accept the data.

Many FIFO designs are known in the art. In a conventional ripple FIFO memory, data is stored in a pipeline memory and exits after some predetermined number of clocks in first-in, first-out format. Pipeline FIFOs limit the rate at which data may be stored to the rate at which it is read. This "fall-through" delay is equal to the depth of the FIFO. Hence, ripple FIFOs tend to have large fall-through delays and suffer from synchronization problems.

An alternative FIFO design provides a write side into which data is written and a read side from which data is read. In this more popular design, a pointer is used on each side to keep track of the amount of data put in or taken out of the memory. Data is available on the feed side after one clock cycle. While this design tends to suffer less fall-through delay, synchronization problems often persist.

In any event, in these speed matching systems, the size or depth of the memory is an important consideration. U.S. Pat. No. 4,873,703, entitled SYNCHRONIZING SYSTEM, issued Oct. 10, 1989 to Crandall et al. and assigned to the present assignee, the teachings of which are incorporated herein by reference, describes a particularly advantageous speed matching scheme which allows for any degree of synchronization reliability by selecting the number of cascaded synchronizers.

The synchronous communication of control pointers across the boundary is achieved with a gray coding scheme by which only one bit changes at a time to eliminate hazards during synchronization. This allows flip-flops to be used as synchronizers to seize the value associated with the control pointers on each clock cycle. However, since the clock signal is in a different time domain than the originating signal, it could violate the set up or hold time of the flip-flop and the flip-flop could go metastable. In this context, the set up time is the time required for the flip-flop to identify a triggering edge of a clock pulse.

Hence, the referenced patent teaches the use of a FIFO memory with gray encoded control pointers that allow only one of the flip-flops on either the read side or the write side to go metastable. Use of a second flip-flop in accordance with a double synchronization scheme provides a full clock cycle for the flip-flop to stabilize in the event that it goes metastable. The term 'metastability' refers to an erroneous output resulting from a sampling between a logical '0' state and a logical '1' state. This helps reduce the chance of failure. The referenced patent teaches a method for determining the correct size of the FIFO to prevent unnecessary holdoff while meeting the synchronization requirement for reliability. Unnecessary holdoff occurs when a data sink and a data source are matched in speed and either the sink or source is forced to hold off (even momentarily) from transferring data.

In short, there are three problems associated with the disclosed system. First, the input setup time to the FIFO is dependent on clock skew, capacitive loading (in the data stage of the FIFO) due to routing, capacitive loading due to fanout, intrinsic setup delays of flip-flops, and pad delays. (Set up time is the amount of time that the data must be stable before the triggering edge of the clock appears.) Most of these can be controlled by design, buffer and component selection. However, capacitive loading due to fanout is normally a function of the size of the FIFO. The larger the FIFO, the larger the capacitive load, and thus the larger the setup time requirement.

Secondly, the output delay time from the FIFO is dependent on clock skew, capacitive loading (in the data stage of the FIFO) due to routing, capacitive loading due to fanout, and intrinsic delays of flip-flops, multiplexors (or tristate bus delays), and pads. Most of these can be controlled by design, buffer and component selection. However, intrinsic delay through multiplexors or tristate bus loading are a function of the size of the FIFO. Hence, the larger the FIFO, the larger intrinsic delay through the multiplexor or the larger the delay on the shared tri-state bus.

Thirdly, the overall operational speed of the FIFO is normally dependent on pad delays in combination with the propagation delay of the combinatorial logic in the control section of the FIFO. In large FIFOs, this propagation delay is a significant limitation on the speed of the overall system.

Thus, there is a need in the art for further improvements in the systems and techniques for effecting synchronous data transfers across domain boundaries with minimal error.

SUMMARY OF THE INVENTION

The need in the art is addressed by the present invention which provides an improved multi-stage synchronizer. The inventive synchronizer includes a first memory for storing data, a second memory connected to the output of said first memory for storing data, and a third memory for storing data connected to the output of said second memory. The second memory includes a plurality of multi-stage first-in, first-out memory devices. In a particular embodiment, the first and third memories are implemented with single stage first-in, first-out memories. In a preferred embodiment, the first-in, first-out memories are designed to allow data to be read and written during a single clock cycle after the memory is filled. This is achieved by adding an external read signal to the 'not full' signal generated by the device.

The provision of single stage FIFO memories on either side of a multi-stage FIFO memory allows for lower set up time and output delay at higher operational speeds.

DESCRIPTION OF THE INVENTION

Illustrative embodiments and exemplary applications will now be described with reference to the accompanying drawings to disclose the advantageous teachings of the present invention.

As mentioned above, U.S. Pat. No. 4,873,703, teachings of which are incorporated herein by reference, describes a particularly advantageous speed matching scheme which allows for any degree of synchronization reliability by selecting the number of cascaded synchronizers. The system uses an N word multi-stage FIFO to synchronize data communication between two uncorrelated systems operating within independent time domains.

Figure 1A:
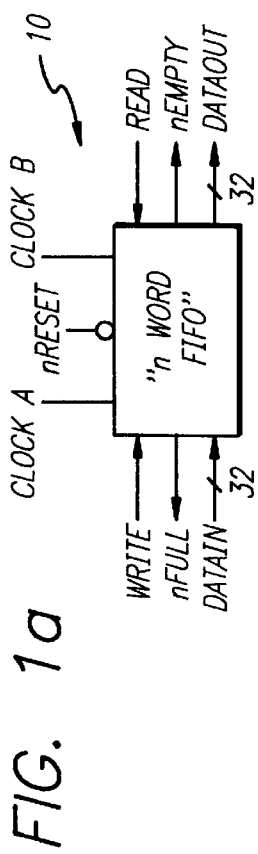
FIG. 1a is a block diagram illustrating the signals connected to the improved N word FIFO of the present invention.
Figure 1B:
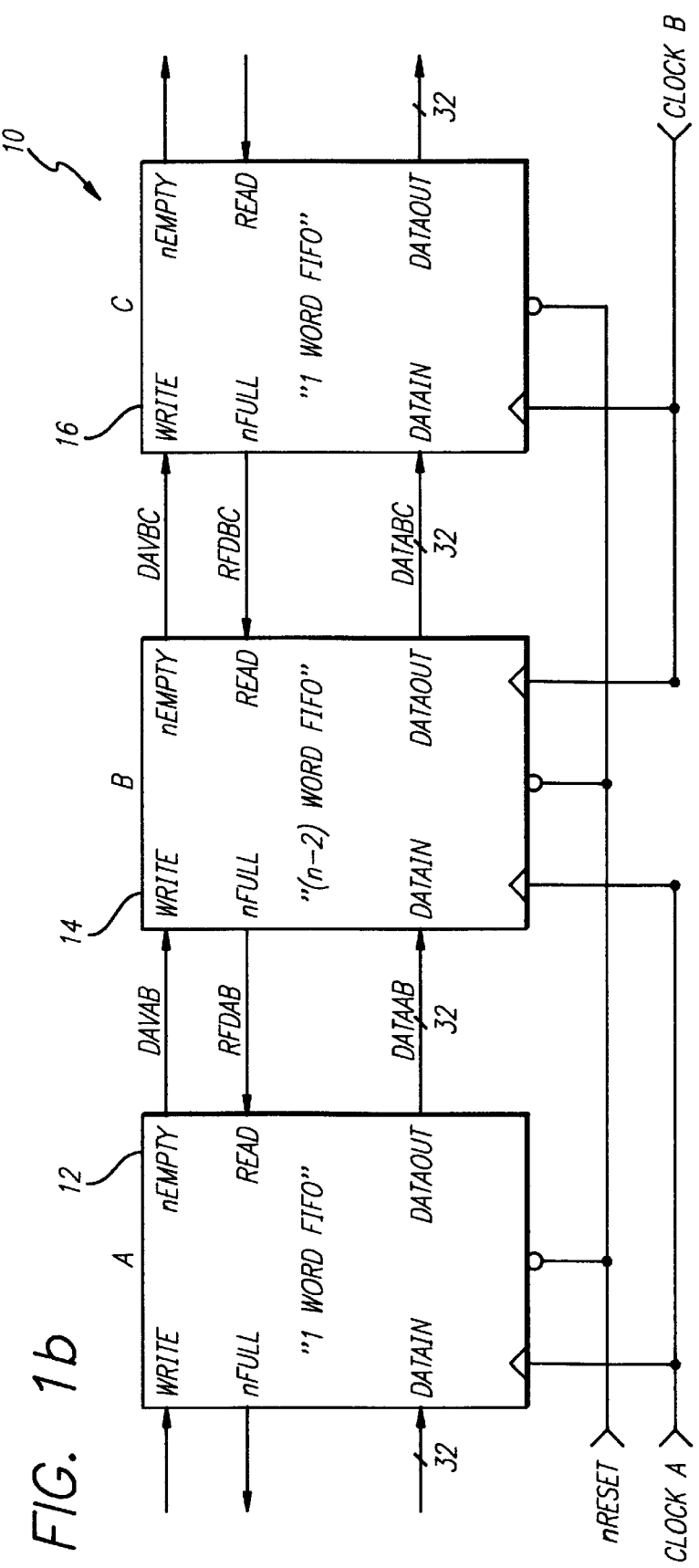
FIG. 1b is a simplified block diagram illustrating the improved multi-stage FIFO design of the present invention.

In accordance with the present teachings, the N word multi-stage FIFO is replaced with an arrangement consisting of two single stage FIFOs and an N-2 stage multi-stage FIFO. FIG. 1a is a block diagram illustrating the signals connected to the improved N word FIFO of the present invention. FIG. 1b is a simplified block diagram illustrating the improved multi-stage FIFO design of the present invention. The improved multi-stage FIFO 10 is implemented with cascaded first and second single stage synchronous FIFOs 12 and 16 and an N-2 multi-stage asynchronous FIFO 14. In the preferred embodiment, the first and second single stage FIFOs are constructed in the manner set forth more fully below. The multi-stage FIFO 14 is implemented in accordance with the teachings of the above-referenced patent to Crandall et al.

Two uncorrelated clocks (A and B) are applied to the system 10 along with a reset signal which resets the pointers of each FIFO. Data is supplied to the first FIFO 12 by the transmitting system (not shown). Next, a write signal is provided by the transmitting system which is set up to its clock (e.g., Clock A). On the next rising edge of the clock signal, the data on the DATAIN bus will be captured by the FIFO if the write signal is asserted. Each FIFO memory is cascaded by connecting the "not empty" (nEMPTY) signal of one FIFO to the write terminal of the succeeding FIFO, the "not full" (nFULL) signal to the read terminal of the preceding FIFO and the data output terminal (DATAOUT) of one FIFO to the data input (DATAIN) terminal of the succeeding FIFO. The receiving system (not shown) reads data from the second single stage FIFO 16 by asserting a read signal and reading data from the data output terminal thereof. Data is written on one clock pulse and transferred on the next clock pulse.

Figure 2:
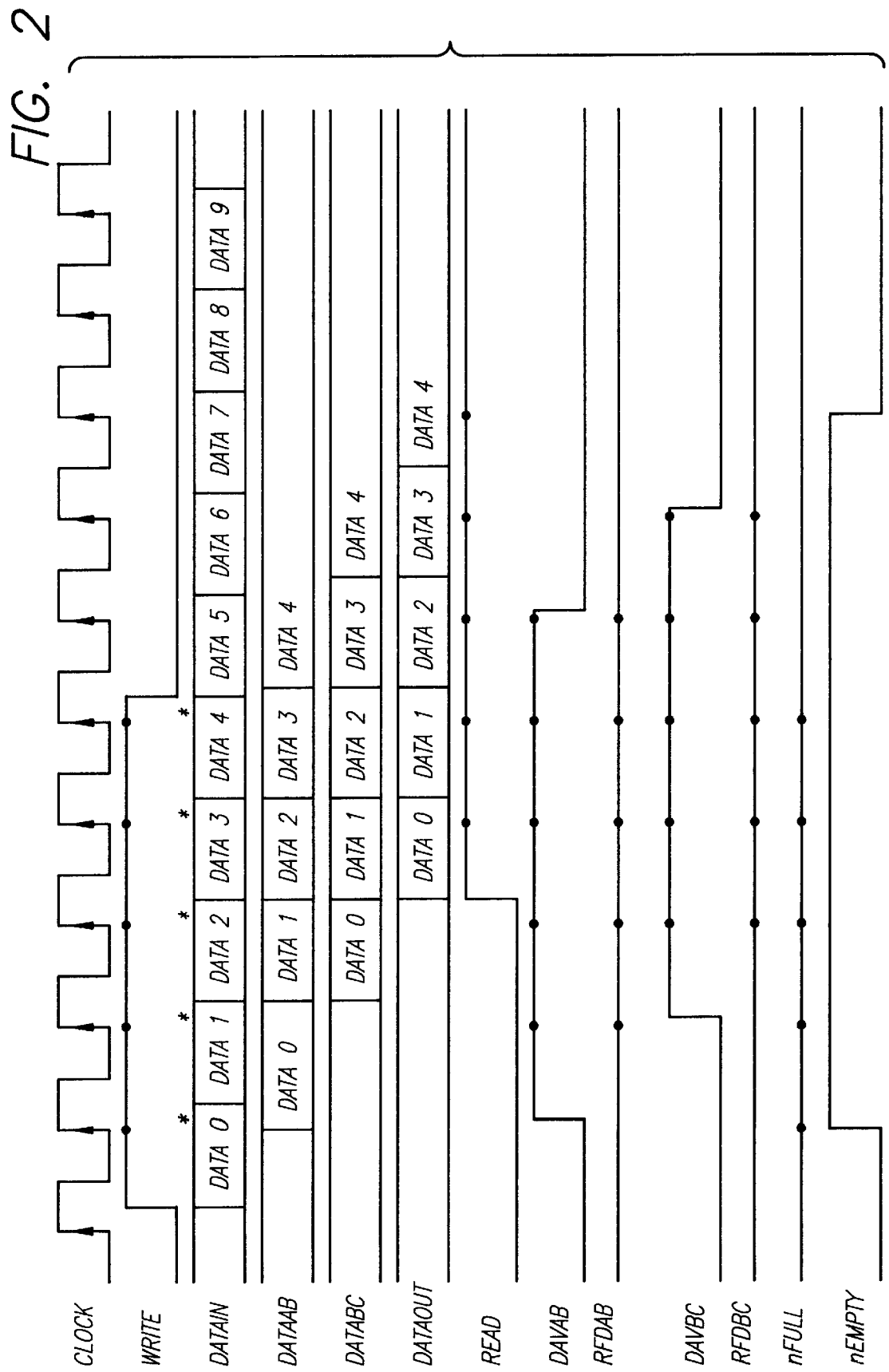
FIG. 2 is a timing diagram which illustrates the operation of the improved multi-stage FIFO of the present invention.

FIG. 2 is a timing diagram which illustrates the operation of the improved synchronizer of the present invention. Data transfers occur on the leading edges of the clock pulses. DATAAB refers to the transfer of data from the first FIFO 12 to the second FIFO 14. DATABC refers to the transfer of data from the second FIFO 14 to the third FIFO 16. DAVAB means that data is available from the first FIFO 12 to the second FIFO 14. Likewise, DAVBC means that data is available from the second FIFO 14 to the third FIFO 16. The RFD designation refers to a ready for data status. These signals are illustrated on the lines between the FIFOs shown in FIG. 1b.

In operation, when the write signal is asserted (goes high) and data is applied to the DATAIN line, on the leading edge of the next clock pulse the first data packet DATA0 is captured by the first FIFO 12. This is designated with a dot on the write signal and an asterisk (*) on the DATAIN line. Note that this first data packet (DATA0) is also simultaneously made available to the second FIFO 14 hence, the DAVAB signal and the nEMPTY signals go high. This advantageous high speed, low hold off mode of operation is made possible by the unique single stage FIFO design as set forth more fully below.

On the leading edge of the next clock pulse, the next data packet (DATA1) is captured by the first memory 12 and the first data packet (DATA0) is transferred from the first FIFO 12 to the second FIFO 14 and so on. Note that since the FIFO 10 of the present invention is implemented with three FIFOs, three clock cycles are required for data to pass therethrough.

After the read signal is asserted by the receiving system, on the next leading clock edge, output data is read from the data output terminal of the third FIFO 16 if data was available.

Figures 3A, 3B:
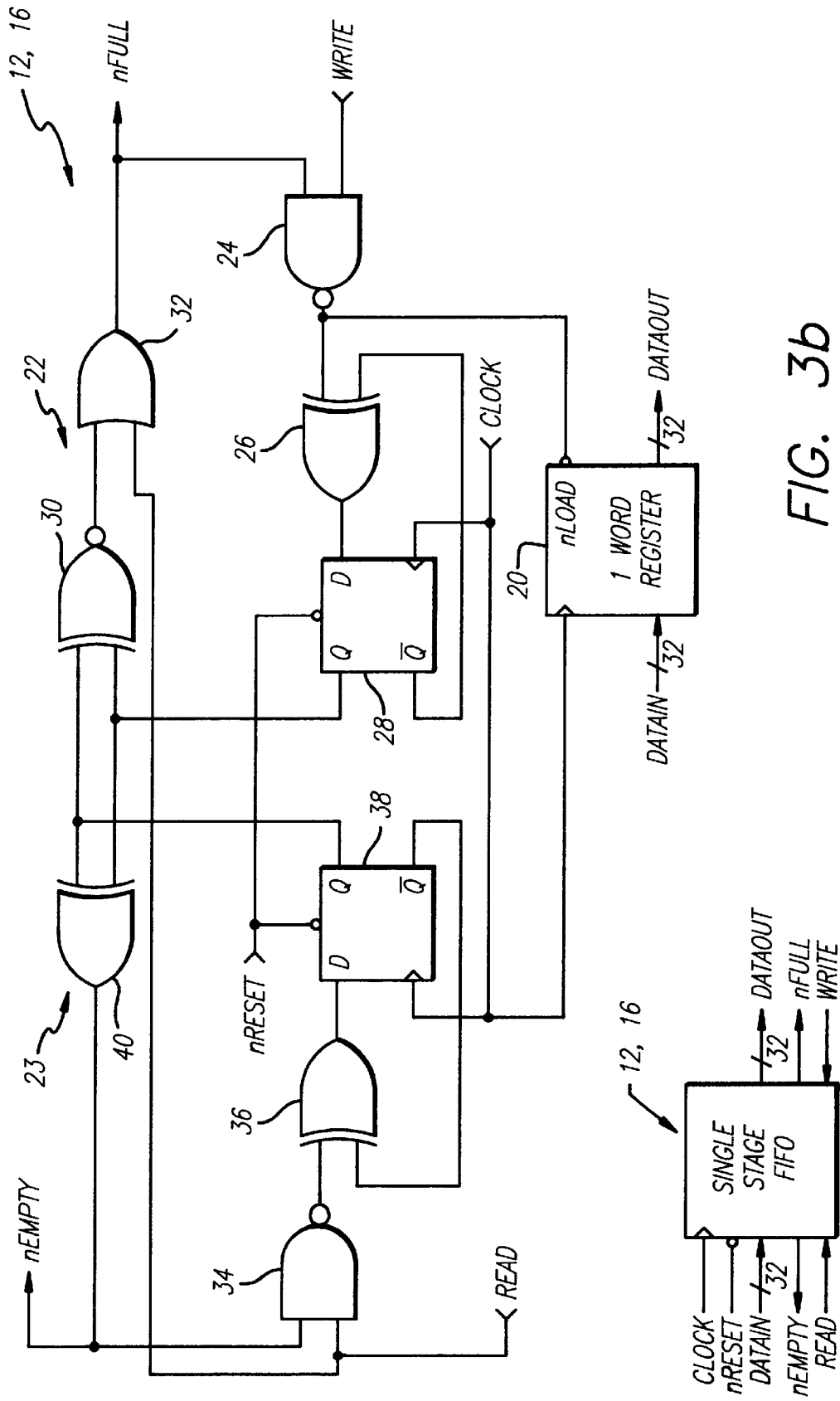
FIG. 3a is a block diagram illustrating the signals connected to the improved single stage FIFO of the present invention.
FIG. 3b is a schematic diagram of the improved single stage FIFO of the present invention.

FIG. 3a is a block diagram illustrating the signals connected to the improved single stage FIFO of the present invention. FIG. 3b is a schematic diagram of the improved single stage FIFO of the present invention. In practice, the advantageous operation of the present invention may be realized with two stage FIFOs in place of the single stage FIFOs. However, performance may decrease as the size of the first and second FIFOs increase. The single stage FIFOs 12 and 16 include a one word register 20 which is connected to the data input and output lines (DATAIN) and (DATAOUT) respectively, a first circuit 22 for generating a 'not full' (nFULL) signal and a second circuit 23 for generating the 'not empty' (nEMPTY) signal. Those skilled in the art will appreciate that, as in conventional systems, where the first FIFO is implemented as an 'n' stage FIFO, the register 20 will be an 'n' stage register. Use of multi-stage FIFOs in place of the single stage FIFOs, however, may create more capacitance due to fanout. A write signal from the transmitting system is received by a first NAND gate 24, in the first circuit 22, which has a second input provided by a not full signal (nFULL) which is generated in the manner discussed more fully below. The output of the NAND gate provides a load signal to the one word register 20. The output of the NAND gate is also input to a first eXclusive OR (XOR) gate 26. The output of the first XOR gate 26 provides the D input for a D flip-flop 28, the Q bar output of which is fed back to provide a second input for the first XOR gate 26. Those skilled in the art will recognize the XOR D flip-flop combination as a traditional T-flop. The Q output of the flip-flop 28 provides a first input to an exclusive NOR (XNOR) gate 30. The second input to the XNOR gate 30 is provided by the Q output of a second D flip-flop 38 which is part of the second circuit 23.

The second circuit 23 includes a second NAND gate 34 which receives a read signal from a receiving system as a first input thereto. A second input to the second NAND gate 34 is provided by the nEMPTY signal in the manner described more fully below. The output of the second NAND gate provides a first input to a second exclusive OR gate 36 which, in turn, provides a D input to the second D flip-flop 38. The Q outputs of the first and second flip-flops 28 and 38, respectively, provide first and second inputs to the XNOR gate 30 and a third XOR gate 40. The third XOR gate 40 provides the nEMPTY signal. The output of the XNOR gate 30 and the read signal are input to an OR gate 32, the output of which provides the nFULL signal.

In operation, a reset signal is supplied which resets the first and second flip-flops 28 and 38, which act as pointers for the data. A write signal is supplied by the transmitting system. Since, the register 20 is empty, the nFULL signal will be high and the output of the NAND gate 24 will be low. This enables the register 20 to load data on the rising edge of the next clock pulse. In addition, the low output of the first NAND gate 24 is combined with high Q bar output of the first flip-flop 28 by the first XOR gate 26. This causes the output of the first XOR gate 26 to go high triggering the first flip-flop 28 and providing a write pointer that indicates that data is available in the register 20.

The operation on the read side is essentially the same with the second flip-flop 38 providing the read pointer. The outputs of the two pointers are compared by the third XOR gate 40. If these pointers are the same, the output of the third XOR gate 40 is low indicating that the register 20 is empty. If the pointers are not equal, the output of the third XOR gate 40 is high indicating that the register 20 is not empty.

A similar comparison is provided by the XNOR gate 30. The inverted output of the XNOR gate 30 essentially allows a '1' to be added to the read pointer. (If the FIFO 12, 16 were implemented as a two stage FIFO, a '2' would be added and so on.) By combining the read signal with the complement of the compare of the two pointers, the FIFO 12, 16 allows for a write on the next cycle if the receiving system is going to read. This allows a single stage FIFO to function with no unnecessary hold off, thereby increasing the performance of the system.

Figure 4:
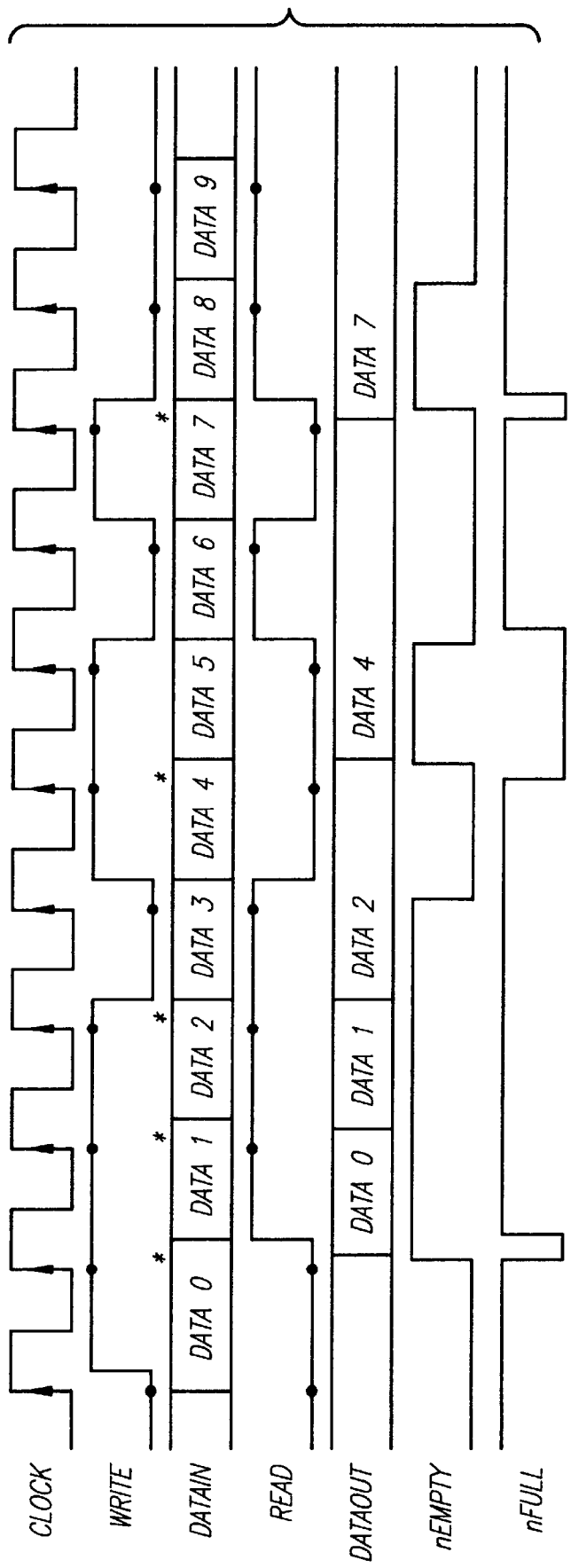
FIG. 4 is a timing diagram which illustrates the operation of the advantageous single stage FIFO design of the present invention.

FIG. 4 is a timing diagram which illustrates the operation of the advantageous FIFO design of the present invention. Again, all changes are relative to the leading edge of the clock and the asterisks (*) indicate words that were actually stored.

When the write signal is asserted and data is provided to the data input bus, on the next clock pulse data is captured by the FIFO and stored in the register 20. At this point, the nEMTPY signal goes high and the nFULL signal goes low. If a read signal is now asserted, the nFULL signal will asynchronously go high, as long as data will be read, data can be output even as data is being written on the next clock pulse. As mentioned above, the unique and advantageous feature of the present FIFO design is afforded by the combination of the read signal with a not full signal. Thereafter, the nFULL signal returns to a high state and the operation continues.

Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

Accordingly,

What is claimed is:

1. A synchronizer comprising:

a first single stage first-in, first-out memory device having an input for receiving data and an output for transmitting data;

memory means having an input connected to the output of said first single stage first-in, first-out memory device for receiving data and an output for transmitting data, said memory means including a plurality of single multi-stage first-in, first-out memory devices; and a second single stage first-in, first-out memory device having an input connected to the output of said memory means for receiving data and an output for transmitting data.

2. The invention of claim 1 wherein said first and second single stage first-in, first-out memories each include a data storage element and means for allowing data to be read from and written to said data storage element during a single clock cycle.

3. The invention of claim 2 wherein said means for allowing for data to be read from and written to said data storage element during a single clock cycle includes means responsive to a write signal and a read signal for generating a signal representing a storage status of said data storage element.

4. The invention of claim 3 wherein said means for allowing data to be read from and written to said data storage element during a single clock cycle includes means for combining said read signal with said signal representing a storage status of said data storage element.

5. The invention of claim 4 wherein means for combining said read signal with said signal representing a storage status of said data storage element includes an OR gate.

6. The invention of claim 2 wherein said means for allowing for data to be read from and written to said data storage element during a single clock cycle further includes second means responsive to a write signal and a read signal for generating a second signal representing a storage status of said data storage element.

\* \* \* \* \*